US010157511B2

(12) United States Patent
Woerz et al.

(10) Patent No.: US 10,157,511 B2
(45) Date of Patent: Dec. 18, 2018

(54) METHOD FOR DIAGNOSING A STATE IN A VEHICLE, AND DIAGNOSTIC TESTING DEVICE

(71) Applicant: Robert Bosch GmbH, Stuttgart (DE)

(72) Inventors: Andreas Woerz, Wernau (DE); Klaus Treiber, Neckartenzlingen (DE); Matthias Engelhardt, Esslingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 93 days.

(21) Appl. No.: 15/308,008

(22) PCT Filed: Mar. 23, 2015

(86) PCT No.: PCT/EP2015/056070
§ 371 (c)(1),
(2) Date: Oct. 31, 2016

(87) PCT Pub. No.: WO2015/169497
PCT Pub. Date: Nov. 12, 2015

(65) Prior Publication Data
US 2017/0053464 A1 Feb. 23, 2017

(30) Foreign Application Priority Data

May 8, 2014 (DE) .................. 10 2014 208 611

(51) Int. Cl.
*G07C 5/08* (2006.01)
*H04L 12/64* (2006.01)
*H04L 12/40* (2006.01)

(52) U.S. Cl.
CPC ............ *G07C 5/0808* (2013.01); *H04L 12/40* (2013.01); *H04L 12/6418* (2013.01); *H04L 2012/40215* (2013.01); *H04L 2012/40273* (2013.01)

(58) Field of Classification Search
CPC ... G07C 5/0808; H04L 12/40; H04L 12/6418; H04L 2012/40273; H04L 2012/40215
See application file for complete search history.

(56) References Cited

U.S. PATENT DOCUMENTS

2005/0171721 A1* 8/2005 Patterson .......... B60W 50/0205
702/122
2009/0248236 A1 10/2009 Schwinke

FOREIGN PATENT DOCUMENTS

CN 102799166 A 11/2012
CN 203186118 U 9/2013
(Continued)

OTHER PUBLICATIONS

Carley, Larry, "Controller Area Network (CAN-bus) Diagnostics" Apr. 3, 2008, pp. 1-3.
(Continued)

*Primary Examiner* — Brian P Sweeney
(74) *Attorney, Agent, or Firm* — Norton Rose Fulbright US LLP; Gerard Messina

(57) ABSTRACT

A method for diagnosing a state in a vehicle, which has a CAN communications bus to which electronic control units of the vehicle are connected, includes providing a rest state of the vehicle; coupling a diagnostic testing device to at least one diagnostic terminal of the vehicle; monitoring of the CAN communications bus by the diagnostic testing device with regard to CAN messages sent out after entry into the rest state; detecting of a CAN message sent out on the CAN communications bus after entry into the rest state, and assigning of the detected CAN message to an electronic control unit sending out the CAN message; providing information regarding a chronological appearance of the detected CAN message in a series of CAN messages appearing on the CAN communications bus after entry into the rest state; and
(Continued)

providing information for identifying the electronic control unit sending out the detected CAN message.

11 Claims, 3 Drawing Sheets

(56) References Cited

FOREIGN PATENT DOCUMENTS

| | | |
|---|---|---|
| EP | 2000874 A2 | 12/2008 |
| WO | 2006056355 A2 | 6/2006 |

OTHER PUBLICATIONS

International Search Report, dated Jul. 15, 2015, of the corresponding PCT application PCT/EP2015/056070 filed Mar. 23, 2015.

* cited by examiner

|  | 31 | 32 | | | | | | |
|---|---|---|---|---|---|---|---|---|
| 21 < | 305 | ff | fb | 00 | 07 | de | 00 | |
| 22 < | 532 | 99 | 9a | 48 | | | | |
| 23 < | 208 | 19 | a8 | 36 | 00 | 4c | ff | ff | 1e |
| 24 < | 228 | 32 | 30 | 00 | 38 | 00 | | |
| 25 < | 348 | 00 | 1e | 6c | 45 | 01 | 03 | 71 | 55 |
| · < | 3c8 | 08 | 00 | | | | | |
| · < | 2f5 | 04 | 00 | 20 | 7f | ff | 00 | 01 |
| · < | 3cd | 00 | 00 | ff | ff | 00 | 22 | 20 | ff |
| · < | 30d | 00 | 00 | 00 | 00 | 00 | 00 | 00 | 00 |
| · < | 34d | 00 | 23 | fa | fa | 00 | 04 | 00 | de |
| < | 3ad | f0 | 00 | 00 | 01 | 7f | b2 | 00 | 46 |
| < | 305 | ff | fb | 00 | 07 | cf | 00 | |
| < | 2eb | 00 | 00 | 10 | f4 | | | |
| < | 612 | 80 | 20 | 01 | 1a | 03 | 69 | 00 | 0c |
| < | 3f2 | 00 | 00 | 18 | | | | |
| < | 432 | 81 | 16 | 48 | 24 | 00 | 02 | 01 | 52 |
| < | 208 | 19 | b0 | 36 | 00 | 4c | ff | ff | 1e |
| < | 228 | 32 | 30 | 00 | 47 | 00 | | |
| < | 468 | 26 | 09 | fe | c2 | 30 | 00 | |
| < | 3cd | 00 | 00 | ff | ff | 00 | 22 | 30 | ff |
| < | 2f5 | f5 | 00 | 20 | 7f | ff | 00 | 01 |
| < | 40d | 00 | 00 | 00 | 04 | 00 | 00 | 00 | 05 |
| < | 38d | 00 | 00 | 00 | 00 | af | aa | 46 |
| < | 305 | ff | fb | 00 | 07 | 30 | 00 | |
| < | 452 | 00 | 00 | 00 | 03 | 00 | | |
| < | 208 | 19 | b0 | 36 | 00 | 4c | ff | ff | 1e |
| < | 228 | 32 | 30 | 00 | 56 | 00 | | |
| < | 348 | 00 | 1e | 6c | 45 | 01 | 03 | 71 | 55 |
| < | 3c8 | 08 | 00 | | | | | |
| < | 3cd | 00 | 01 | ff | ff | 00 | 22 | 30 | ff |
| < | 2f5 | e6 | 00 | 20 | 7f | ff | 00 | 01 |
| < | 30d | 00 | 00 | 00 | 00 | 00 | 00 | 00 | 00 |
| < | 34d | 00 | 23 | fa | fa | 00 | 05 | 00 | de |
| 2n < | 3ad | f0 | 00 | 00 | 01 | 7f | d2 | 00 | 53 |

METHOD FOR DIAGNOSING A STATE IN A VEHICLE, AND DIAGNOSTIC TESTING DEVICE

FIELD

The present invention relates to a method for diagnosing a state in a vehicle, as well as to a diagnostic testing device.

BACKGROUND INFORMATION

A communications bus, such as a CAN communications bus in a vehicle, is typically coupled to a plurality of electronic control units (ECUs), which perform various functions and each form a bus node. Thus, an ECU is provided for door control, for example; the closing and/or opening of the doors being able to be controlled and monitored by the ECU. A microcontroller of an ECU, for instance, of a door control system, receives, for example, via the CAN communications bus, a bus message that a window of the doors should be opened. As a result, the microcontroller executes a so-called task (an operation), which triggers a corresponding circuit to open the window.

A frequent case of a fault in motor vehicles is the discharging of the electrical system battery. Although the vehicle is in a rest state (that is, in particular, the ignition is switched off and the vehicle is locked), defective attachment parts in vehicle systems, defective control units (ECUs), flawed software or incompatible hardware states may activate individual control units. Then, activated control units often send messages continually onto the vehicle communications bus (CAN communications bus) and unintentionally discharge the electrical system battery due to a high power consumption. In many cases, mistakenly activated control units are capable of "waking" several other control units connected to the CAN communications bus and/or canceling their "sleep function." In such a case, the power consumption often discharges an electrical system battery within a few hours and/or when the vehicle stands for a longer period of time.

To date, it has been possible to measure the closed-circuit current of the electrical system battery in a garage, using an ammeter, and to isolate the location of the fault (electrical circuit that is responsible for the increased current flow), by removing the fuses. However, the electrical circuit identified in this manner does not necessarily have to be the fault location triggering the fault. In this context, it may be a sequential fault produced by a malfunction at a different location in the vehicle. Until now, it has not been possible to ascertain, using a diagnostic testing device, the initial fault location for an unwanted activation of a control unit and the accompanying discharge of the battery.

SUMMARY

An object of the present invention is to provide a method for diagnosing a state in a vehicle, and a diagnostic test device, which facilitate the search for faults for a garage.

The present invention relates to a method for diagnosing a state in a vehicle, which has a CAN communications bus to which electronic control units of the vehicle are attached, the method including the following steps: providing a rest state of the vehicle, in which at least a portion of the electronic control units are configured not to send out a CAN message over the CAN communications bus in normal operation (that is, in the case of no faults); coupling a diagnostic testing device to at least one diagnostic terminal of the vehicle, the diagnostic terminal being able to be connected to the CAN communications bus; monitoring of the CAN communications bus by the diagnostic testing device with regard to CAN messages sent out after entry into the rest state; detecting, by the diagnostic testing device, of a CAN message sent out on the CAN communications bus after entry into the rest state, and assigning of the detected CAN message, by the diagnostic testing device, to an electronic control unit sending out the CAN message; providing, by the diagnostic testing device, of information regarding a chronological appearance of the detected CAN message in a series of CAN messages appearing on the CAN communications bus after entry into the rest state; and providing, by the diagnostic testing device, of information for identifying the electronic control unit sending out the detected CAN message.

The present invention also relates to a diagnostic testing device for diagnosing a state in a vehicle, the vehicle including a CAN communications bus, to which electronic control units of the vehicle are connected; the diagnostic testing device having a terminal for coupling to at least one diagnostic terminal of the vehicle, the diagnostic terminal of the vehicle being able to be coupled to the CAN communications bus; a monitoring device for monitoring the CAN communications bus with regard to CAN messages sent out after entry into a rest state of the vehicle, in which at least a portion of the electronic control units are configured not to send out a CAN message via the CAN communications bus in a normal operation, the monitoring device being configured to detect a CAN message sent out on the CAN communications bus after entry into the rest state, and configured to assign the detected CAN message to an electronic control unit sending out the CAN message; and an information device, which is configured to provide information regarding a chronological appearance of the detected CAN message in a series of CAN messages appearing on the CAN communications bus after entry into the rest state, and configured to provide information for identifying the electronic control unit sending out the detected CAN message.

With the aid of the present invention, the locating of faults is facilitated for the garage during vehicle diagnostics. The present invention allows more rapid and reliable identification of the component, which is responsible for an unintentional activation of the CAN communications bus. Instead of, as in known methods heretofore, disconnecting electrical circuits from the vehicle electrical system by pulling out the corresponding fuses, the present invention provides the option of a permanent scanning function of the CAN communications bus, using the diagnostic testing device, in order to monitor the CAN communications bus traffic.

Advantages of the present invention include the ability to eliminate manual activities, such as extracting fuses. The diagnostic testing device may monitor the CAN communications bus traffic for hours, without garage personnel having to be present. In the case of a fault, the analysis results are stored and may subsequently be evaluated. The disassembly of properly functioning parts may also be prevented. In addition, the present invention allows less highly trained garage personnel to carry out a reliable search for faults at the vehicle. Furthermore, the present invention makes it possible to accelerate the search for faults and therefore increases the throughput of the garage. Savings in assembly time could be passed on to the end customer.

Preferably, an information item is provided as to whether the detected CAN message appears first in the series of CAN messages appearing on the CAN communications bus. In this manner, the cause of the fault may be narrowed down to the subsystem, to which the control unit that sent out the detected CAN message belongs.

According to a further specific embodiment, an information item regarding an order of the CAN messages appearing on the CAN communications bus after entry into the rest state is provided. Using the order in which the CAN messages are sent, it may be determined that the unintentional CAN communications bus traffic was triggered by a particular control unit, for instance, the driver's-side door control unit.

According to one specific embodiment, the information regarding a chronological appearance of the detected CAN message is generated in light of a listing of at least a portion of the CAN messages appearing on the CAN communications bus since entry into the rest state.

In one specific embodiment of the present invention, a data content of the detected CAN message is acquired, possibly decrypted, and displayed on the diagnostic testing device. In this manner, even more accurate fault diagnosis and/or fault localization is possible.

An assignment information item is preferably stored in the diagnostic testing device, in order to identify the electronic control unit sending out the detected CAN message with the aid of an identification information item, which is contained in the detected CAN message.

In particular, in order to bring about the rest state of the vehicle, an ignition system of the vehicle is switched off and the vehicle is locked.

According to one specific embodiment, the information item for identifying the electronic control unit sending out the detected CAN message is displayed and stored by the diagnostic testing device.

In one specific embodiment, a detection time, in particular, in the form of a clock time, of the detected CAN message is displayed. Then, an evaluation may be conveniently carried out on the next work day.

According to one specific embodiment, the diagnostic testing device filters out CAN messages of electronic control units, which are configured to send out at least one CAN message via the CAN communications bus in the rest state of the vehicle, during normal operation (that is, in the case of no faults). Depending on the manufacturer, it is often desired that individual control units be switched on at specific times. This behavior may be filtered out by the diagnostic testing device, in order to identify instances of unintended switching-on of control units, which result in higher power consumption.

BRIEF DESCRIPTION OF THE DRAWINGS

Below, the present invention is explained in greater detail with reference to the figures.

FIG. 2 shows an exemplary embodiment of CAN communications bus traffic recorded by a diagnostic testing device of the present invention, the CAN communications bus traffic being caused by an exemplarily described defect.

DETAILED DESCRIPTION OF EXAMPLE EMBODIMENTS

Figure 1:
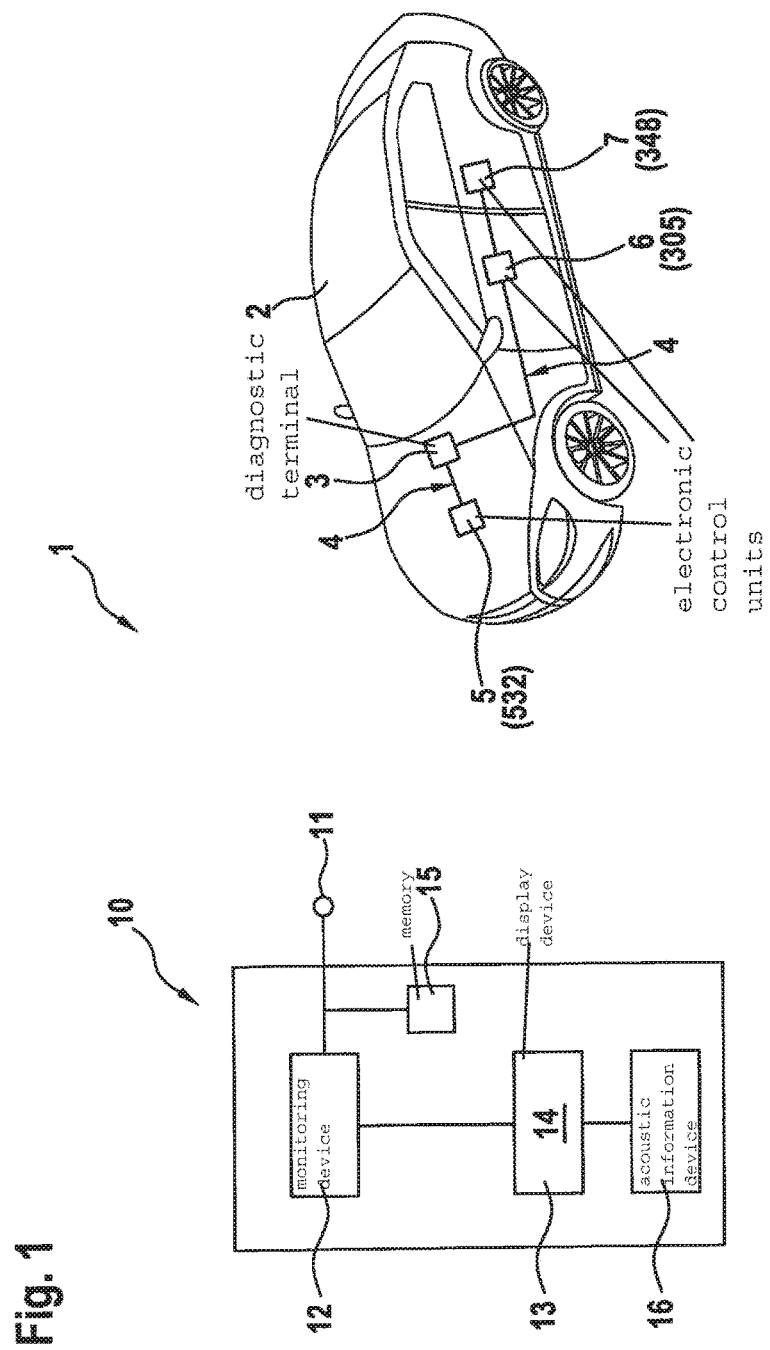
FIG. 1 shows a schematic view of an exemplary embodiment of a set-up including a diagnostic testing device for diagnosing a state in a vehicle.

FIG. 1 shows a schematic view of an exemplary embodiment of a set-up 1 including a diagnostic testing device 10 for diagnosing a state in a vehicle 2, according to an exemplary embodiment of the present invention. Vehicle 2 includes a CAN communications bus 4, as is normally used in motor vehicles, to which electronic control units (ECUs) of vehicle 2 are connected. By way of example, control units 5, 6, 7 are displayed here in the form of central electronics 5, a driver's-side door control device 6 and a rear passenger-side door control device 7. In practice, other and/or further electronic control units are also connected to CAN communications bus 4 (in the following, abbreviated as: CAN bus).

Diagnostic testing device 10 is coupled to at least one diagnostic terminal 3 of vehicle 2 via a terminal 11; the at least one diagnostic terminal being able to be coupled, in turn, to CAN bus 4. The coupling may be carried out directly, or indirectly via other components. A wired or wireless coupling between terminal 11 and diagnostic terminal 3 is also conceivable.

For diagnostic purposes, vehicle 2 is shifted into a rest state. To that end, for example, the ignition system of vehicle 2 is switched off and vehicle 2 is locked. In this rest state, at least a portion of electronic control units 5, 6, 7 are configured not to transmit a CAN message over the CAN communications bus in normal operation. In other words, when no case of a fault is present, control units 5, 6, 7 or a portion of them send no CAN messages on the CAN bus during the rest state of the vehicle.

The diagnostic testing device includes a monitoring device 12 (for instance, in the form of a microprocessor) for monitoring CAN bus 4 with regard to sent-out CAN messages, which appear, in particular, after entry into the rest state of vehicle 2. To this end, monitoring device 12 is configured (for instance, by suitably programming the microprocessor) to detect a CAN message sent out on CAN bus 4 after entry into the rest state, and to assign the detected CAN message to an electronic control unit sending out the CAN message.

The diagnostic testing device also includes an information device, for instance, a display device 13 and/or an acoustic information device 16. As explained below in greater detail with the aid of an example, this is configured to provide information (for instance, in the form of a list 14, as shown in FIG. 2,) with regard to a chronological appearance of a particular, detected CAN message (e.g., CAN message 21, as shown in FIG. 2) in a series of CAN messages 21-2n appearing on CAN bus 4 after entry into the rest state (see FIG. 2). Information for identifying the electronic control unit sending out the detected CAN message is also provided on it, as is explained in greater detail in the following, in light of an example.

In the following, an example of a specific embodiment of the present invention is explained in greater detail. One skilled in the art will recognize that in principle, the exemplary embodiment may be applied to the diagnosis of a state of one or more arbitrary components in a vehicle.

Diagnostic testing device 10 is connected to diagnostic terminal 3 of vehicle 2, using terminal 11. The ignition in the vehicle is to be switched off, vehicle 2 is to be locked, the vehicle is in a rest state.

With the aid of monitoring device 12, diagnostic testing device 10 monitors CAN bus 4 on the corresponding PINs at diagnostic terminal 3. In the positive case (that is, during normal operation, when no-fault is present), then, in the rest state of vehicle 2, no messages are sent by control units 5, 6, 7 onto the CAN bus. Therefore, no CAN bus traffic is present that could discharge the battery.

However, if a control unit, which is connected to the CAN bus, switches itself on, one or more CAN messages are automatically sent onto the CAN bus by this control unit. As represented in FIG. 2, each message 21-2n is "packed" in CAN identifiers 31 (identification information), which are used by a control unit as an address. Diagnostic testing device 10 monitors the CAN bus traffic and assigns sent messages 21-2n to the "sender control unit." In this manner, the control units that first sent CAN messages onto the CAN bus may be located.

If a CAN message is recognized by diagnostic testing device 10 due to an assignment of CAN identifier 31, the corresponding control unit is stored in memory 15 as a message-triggering component and indicated on information device 13 (for instance, in the form of a display). In addition, the exact clock time of the detected CAN bus traffic may be displayed. Then, an evaluation may be conveniently carried out on the next work day.

Depending on the manufacturer, it is often desired that individual control units be switched on at specific times. This behavior may be filtered out by diagnostic testing device 10, in order to identify unintended instances of switching-on of control units, which lead to higher power consumption.

According to FIG. 2, the first column shows CAN identifier 31 (may also be referred to figuratively as an address) of the specific CAN message. Using it, an unequivocal assignment may be made as to, by which system and/or control unit the CAN message was sent. The corresponding content 32 of a specific CAN message is represented in the second column of FIG. 2.

If the ignition of the vehicle is switched off and the vehicle is locked (there are various manufacturer-specific conditions that must be satisfied), then, in the positive case, the control units are set into the so-called "sleep mode" after a particular period of time, and the CAN bus traffic is brought to an end.

In the following, an example of a possible case of damage is described in further detail. Due to water/moisture in the door lock of the driver's side, the door switch will generate an unintentional signal via a short-circuit. As a result, driver's-side door control device 6 is automatically awakened and starts to send a CAN message 21 on CAN bus 4, see FIG. 2. Driver's-side door control device 6 is identified by diagnostic testing device 10 with the aid of CAN identifier 305. In the same manner, CAN message 22 may be assigned to central electronics 5 (via CAN identifier 532), and CAN message 25 may be assigned to rear passenger-side door control device 7 (via CAN identifier 348).

Figure 3:
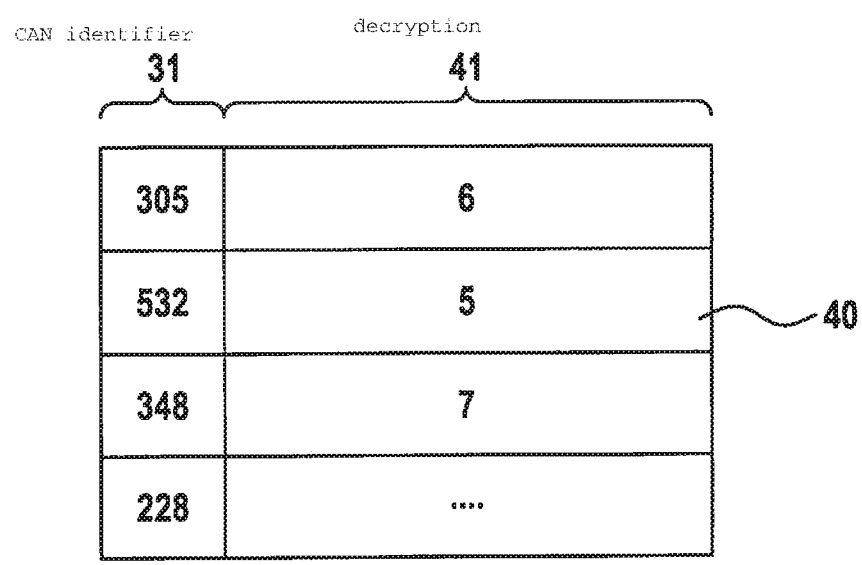
FIG. 3 shows an exemplary embodiment of an assignment table, which is stored in a specific embodiment of a diagnostic testing device according to the present invention.

Fault localization may be carried out in that an unequivocal decryption 41, as to which control unit address (CAN identifier) 31 belongs to which control unit (an example of which is represented in FIG. 3 with the aid of an assignment table 40), is located in the diagnostic testing device (in memory 15) in stored form.

CAN identifier 31 and/or decryption 41 (and therefore, the name of the control unit) are represented in listing 14, which is depicted on display 13. In addition, any display of the detected CAN messages may be selected, as long as an information item with regard to a (relative and/or absolute) chronological appearance of each detected CAN message becomes recognizable. Such an information item may be depicted, e.g., explicitly (for example, the clock time of detection) and/or may be recognizable, in that the specific CAN message was sent first and accordingly displayed first in the list, or that the specific CAN message is situated at a certain position of a series of CAN messages, from which a particular (relative) chronological appearance may be inferred. The information item for identifying the electronic control unit sending out the specific CAN message may be represented by the diagnostic testing device in the form of CAN identifier 31 and/or in the form of decryption 41. Alternatively, or in addition, these information items may be outputted acoustically over a loudspeaker 16.

Using the order in which the CAN messages are sent, it may be recognized, in the present example, that the unwanted CAN bus traffic was triggered by driver's-side door control device 6 (CAN identifier 305). The cause of the fault may be narrowed down to this subsystem. It is quite apparent that due to the "awakening" of driver's-side door control device 6, many other control units were woken up, as well. Now, these control units all send CAN messages via CAN bus 4. Depending on the number of control units, a correspondingly high open-circuit voltage is present, which loads the battery enormously and discharges it.

Since up to now, someone in the garage has hardly had the opportunity to undertake fault localization, a search for faults is very difficult and time-consuming, as described at the outset. Due to this diagnostic option according to the present invention, a more exact system localization is possible, which simplifies the search for faults considerably and automates it. If one is able to store a corresponding decryption 41 of data content 32 of the specific CAN message, then an even more exact fault diagnosis/fault localization is possible.

Therefore, the present invention renders automated monitoring of the CAN bus traffic possible, in order to ascertain instances of unwanted activation of electronic control units. The present invention may be utilized in all vehicles, which use a CAN bus that reaches to the diagnostic terminal. The present invention may be used, in order to monitor, without personnel expenditure, the CAN bus traffic in the rest state of the vehicle and, in the case of a fault, to identify the faulty component and/or the faulty vehicle system. The evaluation intelligence is located outside of the vehicle, in the diagnostic testing device, and is therefore generally applicable to manufacturers.

What is claimed is:

1. A method for diagnosing a state in a vehicle, the vehicle having a CAN communications bus to which electronic control units of the vehicle are connected, the method comprising:
   providing a rest state of the vehicle, in which at least a portion of the electronic control units are configured not to send out a CAN message via the CAN communications bus in a normal operation;
   coupling a diagnostic testing device to at least one diagnostic terminal of the vehicle, the at least one diagnostic terminal being able to be coupled to the CAN communications bus;
   monitoring the CAN communications bus by the diagnostic testing device with regard to CAN messages sent out after entry into the rest state;
   detecting, by the diagnostic testing device, a CAN message sent out on the CAN communications bus after entry into the rest state, and assigning, by the diagnostic testing device, the detected CAN message to an electronic control unit sending out the CAN message;
   providing, by the diagnostic testing device, information regarding a chronological appearance of the detected CAN message in a series of CAN messages appearing on the CAN communications bus after entry into the rest state; and
   providing, by the diagnostic testing device, information for identifying the electronic control unit sending out the detected CAN message.

2. The method as recited in claim 1, wherein information is provided as to whether the detected CAN message appears first in the series of CAN messages appearing on the CAN communications bus.

3. The method as recited in claim 1, wherein information regarding an order of the CAN messages appearing on the CAN communications bus after entry into the rest state is provided.

4. The method as recited in claim 1, wherein the information regarding a chronological appearance of the detected CAN message is generated with the aid of a listing of at least a portion of the CAN messages appearing on the CAN communications bus since entry into the rest state.

5. The method as recited in claim 1, wherein a data content of the detected CAN message is acquired, optionally decrypted, and displayed on the diagnostic testing device.

6. The method as recited in claim 1, wherein an assignment information item is stored in the diagnostic testing device, in order to identify, with the aid of an identification information item, the electronic control unit sending out the detected CAN message, the identification information item being contained in the detected CAN message.

7. The method as recited in claim 1, wherein in order to bring about the rest state of the vehicle, an ignition system of the vehicle is switched off and the vehicle is locked.

8. The method as recited in claim 1, wherein the information item for identifying the electronic control unit sending out the detected CAN message is displayed and stored by the diagnostic testing device.

9. The method as recited in claim 1, wherein a detection time in the form of a clock time of the detected CAN message is displayed.

10. The method as recited in claim 1, wherein the diagnostic testing device filters out CAN messages of electronic control units, which are configured to send out at least one CAN message via the CAN communications bus in the rest state of the vehicle, during a normal operation.

11. A diagnostic testing device for diagnosing a state in a vehicle, the vehicle having a CAN communications bus, to which electronic control units of the vehicle are connected, the diagnostic testing device including:
- a terminal for coupling to at least one diagnostic terminal of the vehicle, the diagnostic terminal of the vehicle being able to be coupled to the CAN communications bus;
- a monitoring device for monitoring the CAN communications bus with regard to CAN messages sent out after entry into a rest state of the vehicle, in which at least a portion of the electronic control units are configured not to send out a CAN message via the CAN communications bus in a normal operation, the monitoring device being configured to detect a CAN message sent out on the CAN communications bus after entry into the rest state, and to assign the detected CAN message to an electronic control unit sending out the CAN message; and
- an information device which is configured to provide information regarding a chronological appearance of the detected CAN message in a series of CAN messages appearing on the CAN communications bus after entry into the rest state, and to provide information for identifying the electronic control unit sending out the detected CAN message.

* * * * *